United States Patent [19]

Readman

[11] Patent Number: 5,527,073
[45] Date of Patent: Jun. 18, 1996

[54] COUPLING

[75] Inventor: Matthew J. Readman, Fairfield, United Kingdom

[73] Assignee: The University of Manchester Institute of Science and Technology, Manchester, United Kingdom

[21] Appl. No.: 185,788

[22] PCT Filed: Jul. 23, 1992

[86] PCT No.: PCT/GB92/01363

§ 371 Date: Jan. 21, 1994

§ 102(e) Date: Jan. 21, 1994

[87] PCT Pub. No.: WO93/02315

PCT Pub. Date: Feb. 4, 1993

[30] Foreign Application Priority Data

Jul. 23, 1991 [GB] United Kingdom ............... 9115850

[51] Int. Cl.⁶ .................................................. F16L 19/08
[52] U.S. Cl. .................... 285/340; 411/353; 411/519; 285/902; 285/321
[58] Field of Search ........................... 285/340, 902, 285/318, 321; 411/352, 353, 517, 518, 519, 525, 526, 527

[56] References Cited

U.S. PATENT DOCUMENTS

| | | | |
|---|---|---|---|
| 2,147,353 | 2/1939 | Scholtes | 285/340 |
| 2,798,748 | 7/1957 | Maurer | 411/519 |
| 3,545,794 | 12/1970 | Wise | 285/340 |
| 3,837,687 | 9/1974 | Leonard | 285/340 |
| 3,985,379 | 10/1976 | Normark | 285/902 |
| 4,073,514 | 2/1978 | Pate | 285/340 |
| 4,084,843 | 4/1978 | Gassert | 285/340 |
| 4,181,329 | 1/1980 | Helm | 285/340 |
| 4,406,483 | 9/1983 | Perlman | 285/340 |
| 4,586,734 | 5/1986 | Grenier . | |
| 4,659,119 | 4/1987 | Reimert | 285/318 |
| 4,667,988 | 5/1987 | Maier et al. | 285/340 |
| 4,696,497 | 9/1987 | Schwarzensteiner . | |
| 4,717,179 | 1/1988 | Haberstock et al. . | |
| 4,747,626 | 5/1988 | Hama et al. | 285/340 |
| 4,886,113 | 12/1989 | Ross et al. | 285/321 |
| 5,232,322 | 8/1993 | Regensburger | 411/353 |

FOREIGN PATENT DOCUMENTS

| | | | |
|---|---|---|---|
| 1440060 | 4/1966 | France | 285/340 |
| 2591309 | 6/1987 | France | 285/340 |
| 533792 | 3/1973 | Switzerland . | |
| 789599 | 1/1958 | United Kingdom | 411/519 |
| 1045296 | 10/1966 | United Kingdom . | |
| 2066914 | 7/1981 | United Kingdom . | |

*Primary Examiner*—Eric K. Nicholson
*Attorney, Agent, or Firm*—Robbins, Berliner & Carson

[57] ABSTRACT

A coupling comprising a first member defining a socket, a second number such as a tube defining a spigot inserted into an open end of the socket, and a locking device received within an annular gap defined between an inner wall of the socket and an outer wall of the spigot. The locking device comprises circumferentially spaced load-bearing members, each load-bearing member extending within the annular gap from a first end which is relatively close to the open end of the socket and a second end which is relatively remote from the open end of the socket. Each load-bearing member is resiliently biased such that the first end engages the socket and the second end engages the spigot, and each load-bearing member is dimensioned such that it acts substantially as a beam in compression to resist withdrawal of the spigot from the socket.

4 Claims, 5 Drawing Sheets

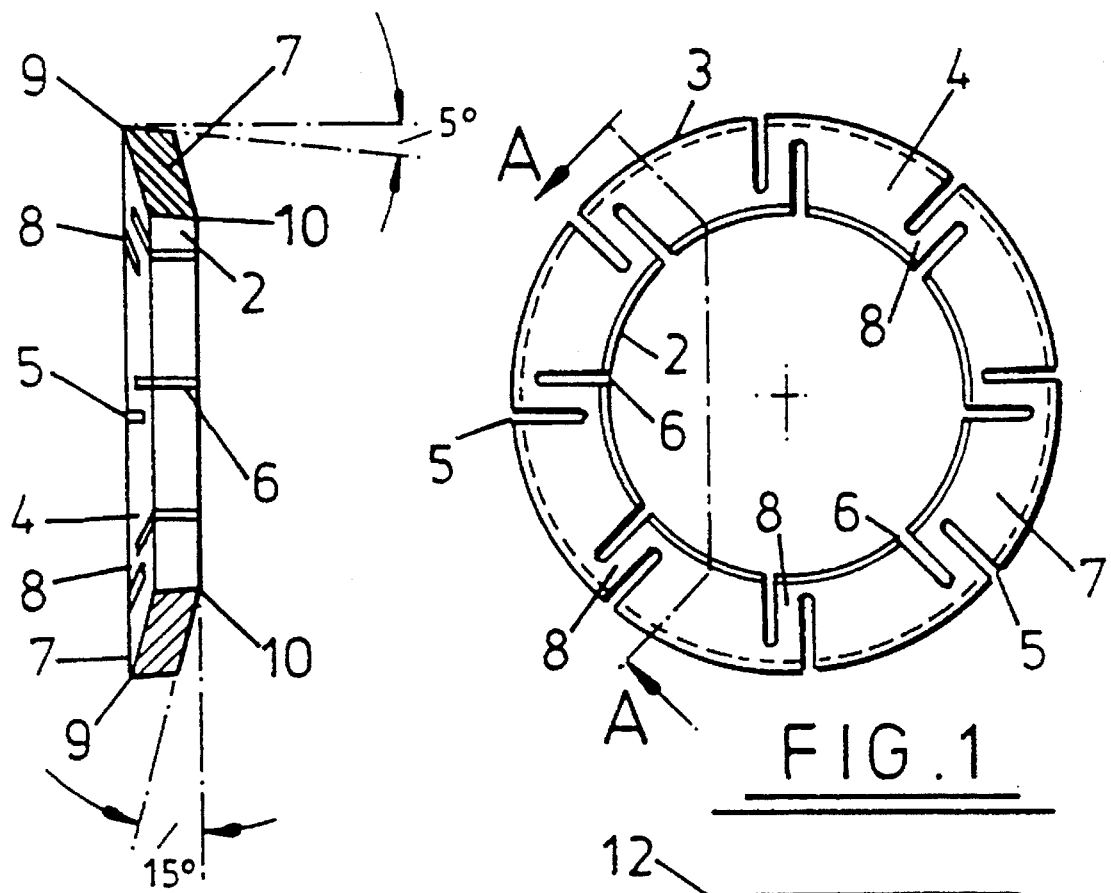
FIG. 1
FIG. 2
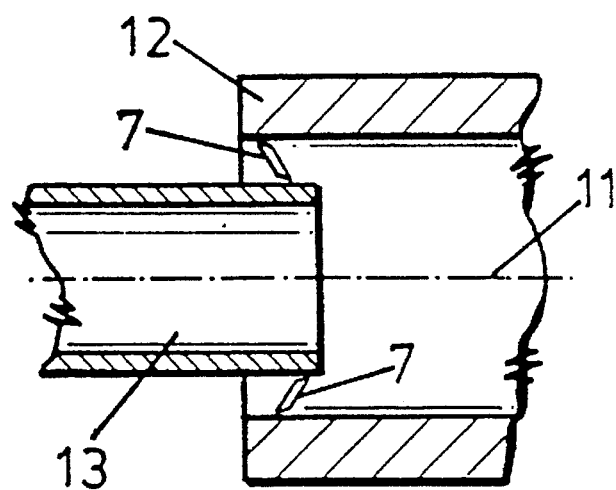
FIG. 3
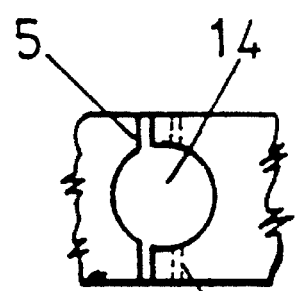
FIG. 4

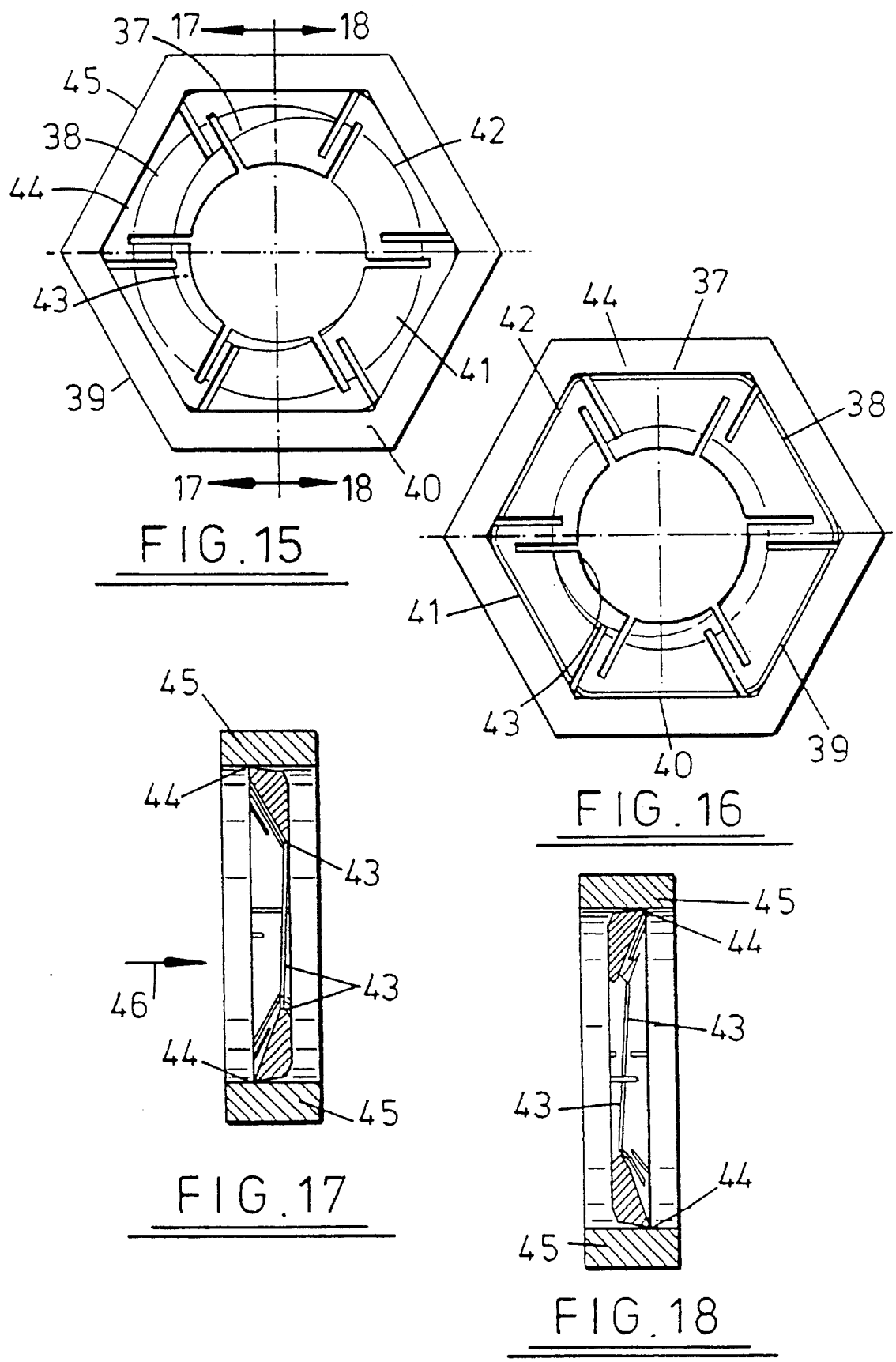

COUPLING

BACKGROUND OF THE INVENTION

1. Field of the Invention

The present invention relates to a coupling and in particular a coupling for joining together a socket and a spigot inserted into the socket.

2. Description of the Related Art

Coupling devices for joining together a socket and a spigot, such as in a pipe fitting, are well known. Many such couplings incorporate a locking ring retaining mechanism. An example of a coupling device incorporating such a form of retaining mechanism is disclosed in U.K. Patent Application No. 2,066,914 A. This describes a releasable coupling device comprising a fitting having an opening for receiving the end of a tube and a retaining ring located in the opening. The retaining ring has a plurality of axially extending, inwardly biased fingers adapted to engage an inserted tube to restrain it against axial movement out of the fitting. The device is provided with an unlocking collar which may be used to force the plurality of fingers radially outward, thereby disengaging the fingers from the tube.

U.S. Pat. No. 4,696,497 describes a coupling which can be used to connect a variety of fittings such as fluid lines and electric cables. The coupling comprises a tubular socket dimensioned to receive the end of a tubular spigot. The spigot has recesses formed near its ends which serve as detent means. A locking ring is inserted into the socket and comprises a plurality of radially resilient fingers which extend axially into the aperture of the socket, angled so as to have oblique portions extending towards the mouth of the socket. The diameter of the spigot is greater than that of an imaginary circle defined by the ends of the resilient fingers. The spigot is pushed into the socket, deflecting the resilient fingers which snap into the recesses. Axial removal of the spigot from the socket is prevented by the location of the fingers within the detente recesses. To remove the spigot it must first be rotated within the socket to cam the fingers out of the recesses.

Similar devices are known for retaining a cap on the end of a spigot in the form of a rod which serves for example as an axle in a childs toy. Such cap devices incorporate a cup-shaped casing defining a socket, the rim of which is bent inwards to define an annular slot which opens radially inwards. A spring steel disc is retained in the slot, a star-shaped aperture being cut in the disc so that the edges of the aperture define pointed spring fingers extending radially inwards. The casing can be secured on the end of a rod the diameter of which is greater than the diameter of the circle touched by the tips of the spring fingers, simply by pushing the rod into the aperture. This causes the spring fingers to deflect and bite into the rod so as to prevent its removal.

Each of the above described structures has the disadvantage that any axial load on the coupling which tends to pull the spigot out of the coupling is born by the force exerted by deflection of the spring fingers. The greater the load applied to the coupling, the more the spring fingers will bend. By the very nature of springs, a bent spring will store energy. As the load applied to the coupling is increased there comes a point when the energy stored in the spring fingers is sufficient to cause them to deflect into a shape which disengages them from the spigot. The coupling then fails.

SUMMARY OF THE INVENTION

Alternatively the spring fingers may simply yield or snap under high load as their strength is limited by the need to be flexible. The spring fingers cannot be made very stiff or they will not be able to engage the spigot under light loads.

It is an object of the present invention to provide a coupling which obviates or mitigates the above disadvantages.

According to the present invention there is provided a coupling comprising a first member defining a socket, a second member defining a spigot inserted into an open end of the socket, and a locking device received within an annular gap defined between an inner wall of the socket and an outer wall of the spigot, wherein the locking device comprises a plurality of circumferentially spaced relatively stiff load bearing members interconnected by relatively flexible interconnecting means, each load bearing member extends within the annular gap between a first end which is relatively close to the open end of the socket and a second end which is relatively remote from the open end of the socket, and the interconnecting means resiliently bias each load bearing member such that the first end engages the socket and the second end engages the spigot, the interconnecting means enabling each load bearing member to pivot about the first and second ends substantially independently of the other load bearing members, such that each load bearing member acts as a beam in compression to resist withdrawal of the spigot from the socket.

The locking device may comprise an annular member of resilient material defining a front face, a back face, a radially inner surface and a radially outer surface, the annular member being provided with a plurality of radial slots grouped in pairs, one slot of each pair extending radially outwards from the radially inner surface of the annular member and the other extending radially inwards from the radially outer surface of the annular member, the arrangement being such that a load bearing member is defined between neighbouring pairs of slots and each pair of slots defines the resilient interconnection between adjacent load bearing members.

Preferably the annular member is provided with apertures extending radially therethrough at the location of each pair of slots.

In an alternative arrangement the locking device may comprise an arrangement of individual load bearing members supported within a collar of elastomeric material. The said collar may then provide both the resilient interconnection between adjacent load bearing members and the said biasing means.

It will be appreciated that the annular arrangement of the load bearing members need not be circular but could be any required configuration depending on the profile of the spigot and socket.

In an embodiment of the invention in which either the spigot or the socket defines a cylindrical surface against which the load bearing members bear, the portion of the load bearing members which bear against the cylindrical surface may define sections of a helix such that the coupling may be disengaged by relative rotation between the spigot and socket. Both the radially inner and outer ends of the load bearing members may define helices, each engaging a respective cylindrical surface, in which case the coupling will disengage whichever surface the locking member slides relative to as a result of rotation. Alternatively, one of the radially inner and outer edges of the locking device defines a helix and is free to slide relative to the surface against which it bears, whereas she other edge defines a circle and is prevented by keys or other suitable formations from sliding relative to the surface against which it bears, or the other edge defines a non-circular shape matching the shape of the surface it engages such that relative rotation is not possible.

BRIEF DESCRIPTION OF THE DRAWINGS

A spreader plate may be provided around the spigot to spread the lead applied by the locking device over the surface of the spigot. Furthermore, a stiff insert may be provided inside the spigot to support the spigot against radial loads applied by the locking device. The insert preferably defines an annular groove facing radially outwards and axially aligned in the assembled coupling with the locking device.

Embodiments of the present invention will now be described, by way of example, with reference to the accompanying drawings, in which:

FIG. 1 is a front elevation of a locking device of a coupling according to an embodiment of the present invention;

FIG. 2 is a cross-section of FIG. 1 taken on the line A—A;

FIG. 3 is a cross-section of a simple coupling incorporating the locking device of FIGS. 1 and 2;

FIG. 4 illustrates a modification of the locking device of FIGS. 1 and 2:

FIGS. 15 and 16 are views from opposite sides of a locking device in accordance with the invention received in a six-sided socket;

FIGS. 17 and 18 are sections on lines 17—17 and 18—18 of FIG. 15; and

DESCRIPTION OF THE PREFERRED EMBODIMENTS

Figure 5:
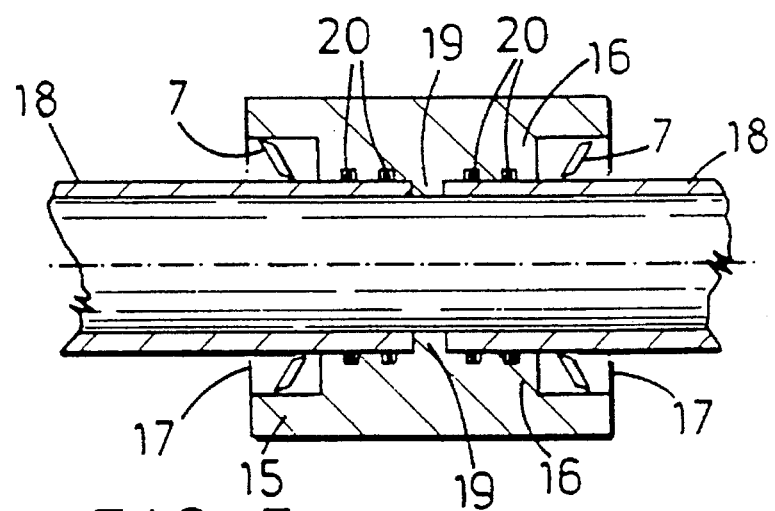
FIG. 5 is a cross-section of a pipe coupling according to the present invention.

Referring to FIGS. 1 and 2 the illustrated locking device comprises a metal ring defining a back face 1, a radially inner surface 2, a radially outer surface 3, and a front face 4. The ring is provided with eight equidistant pairs of slots 5 and 6. Each pair of slots comprises a slot 5 extending radially inwards from the outer surface 3 of the ring to a depth just less than the radial thickness of the ring, and a substantially parallel slot 6 of the same depth but which extends radially outwards from the inner surface 2 of the ring. The slots 5 and 6 are the same width. The pairs of slots 5 and 6 define strut portions 7 and spring portions 8 of the ring. The resultant arrangement is an annular array of struts 7 resiliently interconnected by a series of springs 8. The struts 7 are therefore capable of a significant freedom of movement with respect to one another.

In cross-section, as shown in FIG. 2, the radially inner and outer surfaces, 2 and 3, of each strut are parallel and inclined at an angle of approximately 5° to the central axis of the ring. The front and back faces, 4 and 1, of each strut 7 are also parallel and are inclined at an angle of approximately 15° to a radius drawn to the centre of the ring. Thus the radially outermost circumference 9 of the ring is defined by the outer radius of the front face 4 and the radially innermost circumference 10 of the ring is defined by the inner radius of the back face 1.

The basic manner in which the abovedescribed locking device is employed in a simple coupling is illustrated in FIG. 3. The locking ring is inserted into a socket 11 of a fitting 12 which is to receive a spigot 13. The dimensions of the ring are chosen such that prior to insertion into the socket 11 the radially outermost circumference of the ring defined by the edges 9 has a diameter slightly greater than the internal diameter of the socket 11. The flexibility of the ring due to the spring portions 8 allows the ring to be pushed into the socket 11 to form a tight fit therewith with the edges 9 of the struts 7 bearing against the inner surface of the socket 11. The spigot 13, which has a diameter slightly greater than the internal diameter of the ring defined by the edges 10 of the struts 7, is then inserted into the socket 11 through the ring. Again, the flexible nature of the ring allows the spigot 13 to be pushed therethrough forming a tight fit with the edges 10 of the struts 7 bearing against the surface of the spigot 13.

If an axial force is now applied to the spigot 13 to withdraw it from the socket 11, the frictional force between the spigot 13 and the edges 10, and the frictional force between the inner wall of the socket 11 and the edges 9, will cause the edges 9 and 10 to bite into the socket 11 and spigot 13 respectively. Once the edges 9 and 10 of the struts 7 have bitten into the socket 11 and spigot 13 they form effective hinges about which the struts 7 will tend to pivot as further axial load is applied to the coupling. The length of the struts 7, i.e. the distance between the edges 9 and 10, is greater than the annular separation of the socket 11 and spigot 13. Thus the pivotal action of the struts 7 about the hinges formed by the edges 9 and 10 will tend to compress the struts 7, with a resultant force being applied between the socket 11 and the spigot 13 which will retain the spigot 13 within the socket 11.

The load bearing capability of the coupling will be determined by the ability of the struts 7 to withstand the compressive force exerted thereon. The greater the axial load on the coupling, the greater will be the compression of the struts 7 and therefore the greater will be the force applied by the struts 7 to the spigot 13 and socket 11. Therefore provided the struts 7 are constructed from a sufficiently strong material, i.e. preferably at least as strong as the material from which the spigot 13 and socket 11 are constructed, and provided they are sufficiently thick, then the coupling will be able to withstand significant loads. Tests have shown that couplings of this sort can withstand loads of up to an order of magnitude greater than the loads that can be born by the prior art couplings described above which rely upon spring fingers to resist axial loads.

In one embodiment of a locking ring as illustrated in FIGS. 1 and 2, the ring had the following dimensions:

axial width of radially inner surface 2=11 mm axial width of radially outer surface 3=12 mm radial width of back face 1=6 mm radial width of front face 4=5 mm width of slots 5 and 6=1 mm separation of slots 5 and 6=1 mm The load bearing capabilities of this type of coupling are derived from the structure of the locking ring and the fact that each of the struts 7 acts essentially independently of the others. Thus the spring force exerted on the struts 7 by the spring portions 8 is negligible compared with the compressive forces exerted on the struts 7. Thus the struts 7 behave substantially as beams in pure compression, i.e. all forces acting on the struts other than the compressive force are negligible. The struts 7 are therefore not subjected to any forces such as secondary spring moments that can cause failure in the prior art couplings as described above. The present couplings also have the advantage that they only remain stressed so long as an axial load is applied to them. When such a load is removed, the struts 7 will relax. As a result of this property the couplings are very effective at bearing cyclic loads as they will not be subject to cumulative stressing, exhibited by many prior art couplings, which can lead to failure.

As described above the relative independence of the struts 7 within the locking ring is important to the strength of the coupling. The forces applied by the spring portions 8 to the struts 7 serve only to maintain the struts 7 in the required array when there is no load on the coupling and to provide the necessary biasing force to ensure the edges 9 and 10 bear against the socket 11 and spigot 13 respectively. The spring forces play no part in resisting axial loads.

The force exerted by the spring portions 8 can be minimised by increasing the depth of the slots 5 and 6 in each pair and cutting them closer together. FIG. 4 shows a locking device in which the spring force has been further reduced by cutting further circular slots 14 radially through the ring at the location of the slots 5 and 6. The slots 14 divide the spring portions 8 into two much smaller spring portions with a resultant decrease in the spring force applied to the struts 7.

There are many different possible applications and modifications of the simple coupling described above. An example of a coupling to be used to join two lengths of pipe is illustrated in FIG. 5. The illustrated coupling has a substantially cylindrical body 15 with an internal annular flange 16 which defines sockets 17 and an internal tubular channel dimensioned to receive pipes 18. The flange 16 is itself provided with a radially inward extending annular flange 19 intermediate its ends. Locking rings are inserted into the sockets 16 in the manner described above such that the struts 7 assume the positions shown. The pipes 18 are then inserted into the coupling through the sockets 17 and the locking rings until they abut the flange 17. The locking rings are dimensioned to engage the facing cylindrical surfaces defined by the outer wall of the pipes 18 and the inner wall of the sockets 17. The flange 16 is provided with "O" rings 20 to seal the pipes 18 within the coupling. The locking rings functions as described above in relation to FIG. 3.

Figures 6, 7, 8:
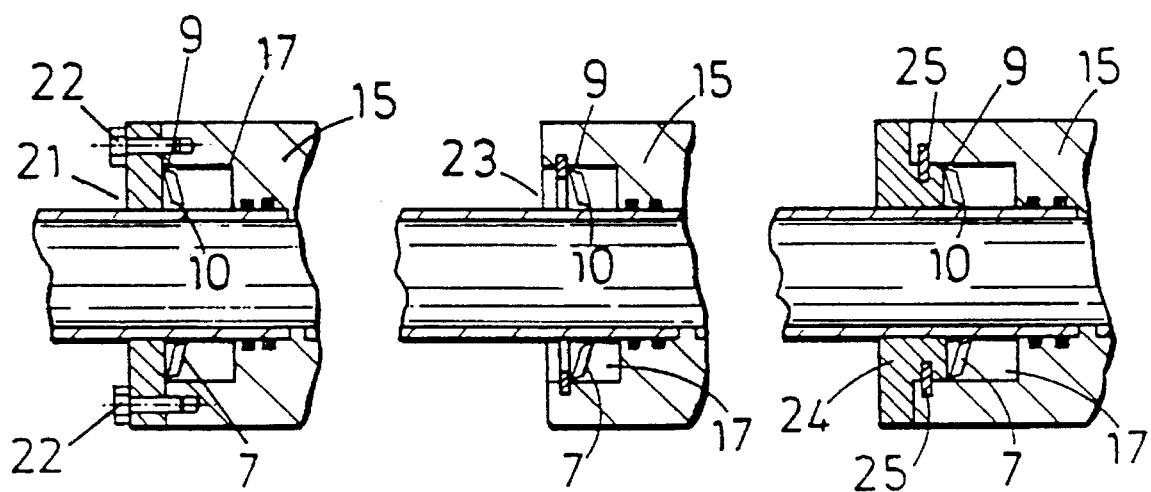
FIGS. 6 to 8 illustrate three alternative releasable couplings according to the present invention.

The couplings so far described are of a type that cannot be released once formed. This is because once the struts 7 have bitten in to both the spigot and socket the locking ring cannot be withdrawn from the coupling. Examples of releasable couplings according to the present invention are illustrated in FIGS. 6 to 8. Each of FIGS. 6 to 8 shows one half of a coupling of the type described above and illustrated in FIG. 5 but with modifications to allow the coupling to be released once formed. In each case the radially outer edges of the struts 7 are rounded off so that they will not bite into the internal wall of the socket 17. The couplings are instead provided with restraining means that prevent the rounded radially outer edges of the struts 7 from sliding along the internal wall of the socket and therefore enable them to form a hinge with the socket wall.

The coupling of FIG. 6 is provided with a removable annular flange 21 which is fixed on to the end of the fitting around the mouth of the socket 17 by means of bolts 22. The flange 21 restrains the axial movement of the struts 7 along the inner surface of the socket 17 when load is applied to the coupling. The rounded edges 9 of the struts 7 form hinges in the corner formed between the flange 21 and the internal surface of the socket 17 whilst the edges 10 of the struts 7 form hinges by biting into the pipe wall. In all respects other than the means by which the outer hinge is formed the modified struts 7 function as described above. To release the coupling the removable flange 21 is simply unbolted from around the mouth of the socket 17 so that the ring can be withdrawn from the coupling.

Alternative means for retaining the locking ring 1 within the socket 17 are shown in FIGS. 7 and 8. The restraining means illustrated in FIG. 7 comprises a cir-clip 23 which is located in an annular groove provided on the internal wall of the socket 17. The restraining means shown in FIG. 8 comprises an insert member 24 which is located within the socket 17 by means of bayonets 25 which cooperate with suitable formations (not shown) on the internal wall of the socket 17. The bayonet fitting allows for easy insertion and removal of the insert member 24.

The locking device retaining means, 21, 23 and 24, do not have to be particularly securely fastened to the socket 17 as virtually all of the force on the hinge formed by the rounded edge 9 of the struts 7 is born by the internal wall of the socket 17. The axial force acting on the restraining means is negligible, the retaining means serving simply to enable the hinge to be established and subsequently released.

Figure 9:
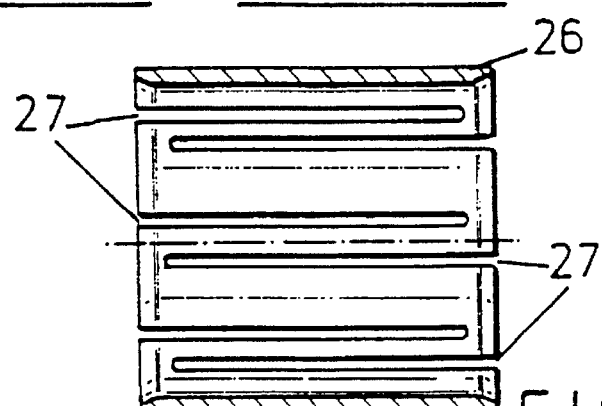
FIG. 9 illustrates a component of a coupling according to the present invention adapted to be used in conjunction with a soft spigot.

The couplings so far described are not very suited to the joining of soft materials which are not hard enough to bear the compressive force in the struts 7. For example if the above described fittings were used in conjunction with a composite tube which is very strong and light but has a soft matrix, then the hinge forming edges 10 of the struts 7 would dig deeply into the tube allowing the struts 7 to pivot fully and reverse their orientation within the annular gap between the tube and the socket so that the tube can be withdrawn from the socket. However, the present couplings can be used to join soft materials if the spigot is first fitted with a spreader plate, an example of which is illustrated in FIG. 9.

The illustrated spreader plate is formed from a tube 26 of a strong material and provided with circumferentially spaced pairs of longitudinal slots 27 in an arrangement similar to that of the slots 5 and 6 cut into the locking ring. The result is a relatively flexible tubular structure that can be fixed around a soft spigot before such a spigot is inserted into the socket of the coupling. The edge 10 of the struts 7 can then form a hinge on the relatively hard spreader plate which will bear a much greater load than a hinge formed on the softer material of the spigot.

Figure 10:
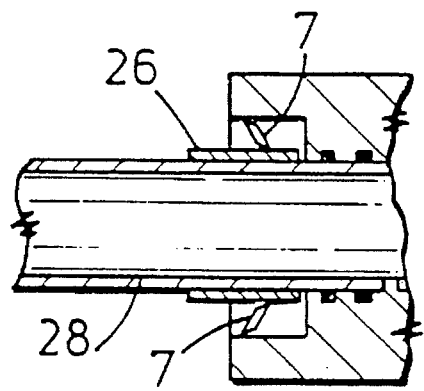
FIG. 10 illustrates a first coupling incorporating the component of FIG. 9.
Figure 11:
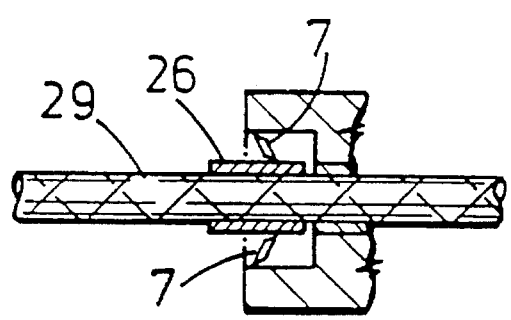
FIG. 11 illustrates a second coupling incorporating the component of FIG. 9.

Examples of couplings incorporating such a spreader plate are illustrated in FIGS. 10 and 11. FIG. 10 illustrates the use of a spreader plate 26 in a pipe coupling for coupling a relatively soft pipe 28 to a fitting. FIG. 11 shows the use of a spreader plate 26 in a coupling to be used to secure a rope 29 or the like to a fitting.

Figure 12:
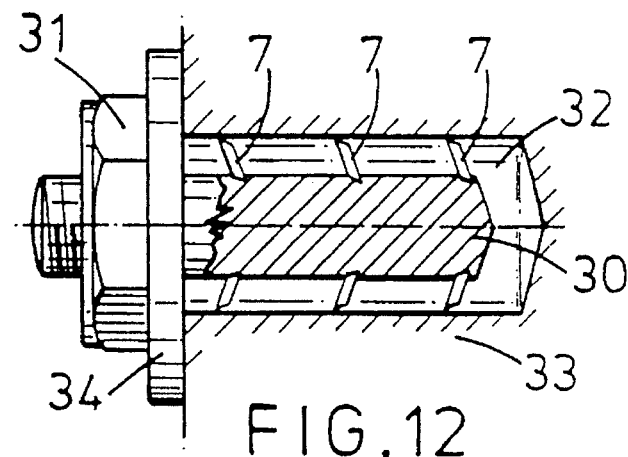
FIG. 12 is a part section of a coupling according to the present invention adapted to support a fitting.
Figure 13:
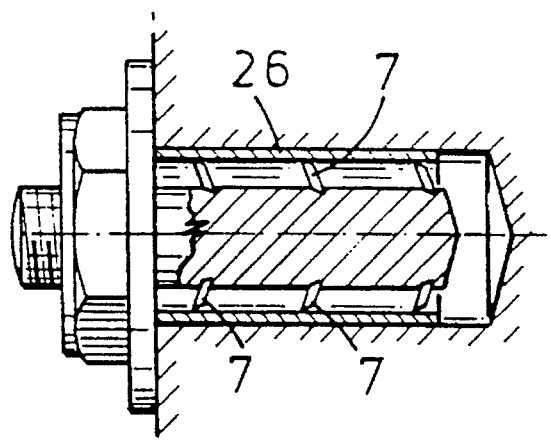
FIG. 13 illustrates the coupling of FIG. 12 incorporating the component of FIG. 9.

FIGS. 12 and 13 illustrate the use of the above described locking rings in a coupling adapted to be used as a fixing, for example to fix a fitting to a wall or other such surface. In the fixing shown in FIG. 12 three such locking rings are assembled on to a pin 30 and located within annular grooves which assist the edges 10 of the struts 7 in establishing a hinge on the pin 30. One end of the pin 30 is threaded to receive a nut 31. A hole 32 of appropriate dimensions is drilled into a surface 33 to provide the necessary socket for the coupling. The pin 30, with locking rings already fitted, is then pushed into the hole 32 such that the threaded end extends from the hole 32. The rings will function as described above to prevent the pin 30 from being withdrawn from the hole 32. A fitting 34 can then be fitted over the threaded end of the pin 30 and secured thereto by the nut 31. A plurality of locking rings are provided in this form of coupling to ensure that the load is evenly distributed and prevent the pin 30 twisting within the hole 32.

FIG. 13 shows the coupling of FIG. 12 in conjunction with a spreader plate 26, which may be necessary if the internal surface of the wall etc. is not sufficiently hard.

Figure 14:
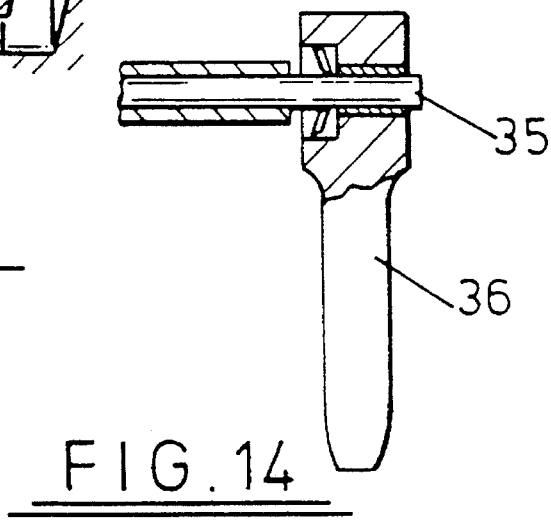
FIG. 14 illustrates a coupling according to the present invention adapted for use as an electrical connector.

FIG. 14 shows an embodiment of the present invention as an electrical connector. The example shown is that of a copper wire 35 coupled to a pin 36 of a plug. The coupling functions in exactly the same way as described above but on a much smaller scale.

As mentioned above an important aspect of the operation of the described couplings is the action of the annular arrangement of struts which are essentially independent of each other and therefore behave as beams in substantially pure compression. The struts need not necessarily be arranged perfectly symmetrically within the coupling but anything other than a symmetric annular arrangement will result in an uneven radial force being applied to the spigot and socket of the coupling which is undesirable.

As described above the function of the spring portions between the struts is simply to maintain the struts in the required orientation and to provide the necessary force to ensure that the edges 9 and 10 of the struts bear against the surface of the sockets and spigots respectively. However, it will be appreciated that there are many alternative ways in which this can be achieved. For instance, the struts could be arranged in annular array and interconnected by means of a rubber collar. The annular rings previously described could be provided with many different numbers of pairs of slots 5 and 6 defining more or less struts 7.

Referring to FIGS. 15 to 18, the illustrated embodiment of the invention incorporates a six-sided locking device received in a six-sided socket. The locking device defines a circular central aperture intended to receive a spigot (not shown) having a cylindrical outer wall.

The locking device comprises six load bearing members 37 to 42 with each adjacent pair of load bearing members interconnected by a strip of material defined between two parallel slots. One of each pair of slots extends radially outwards from the edges 43 to the circular aperture, whereas the other of the pair of slots extends radially inwards from the outer edge 44 of the device which engages the socket 45.

The edges 44 lie on a common plane perpendicular to the length of the socket 45. In contrast, the edges 43 define portions of a helix. A spigot (not shown) can be inserted into the socket in the direction indicated in FIG. 17 by arrow 46. This causes the load bearing members to pivot slightly about hinges defined by the outer edges 44. The spigot cannot then be withdrawn as the edges 43 engage the spigot and the load bearing members pivot backwards about edges 44, jamming the load bearing members in engagement with both the socket and the spigot. The coupling can however be disengaged by rotating the spigot anti-clockwise relative to the socket looking in the direction of arrow 46 in FIG. 17. The edges 43 define a thread through which the spigot can be screwed until the end emerges from the locking device.

It will be appreciated that in the embodiment of FIGS. 15 to 18 rotation of the spigot relative to the socket must cause the spigot to rotate relative to the locking device as rotation of the locking device relative to the socket is prevented as a result of their making six-sided shapes. The socket could however by cylindrical but in such a configuration it would be necessary to key the locking device to the socket to prevent relative sliding movement between them.

Alternatively, if both the socket and spigot define cylindrical surfaces engaged by the locking device, both the radially inner and radially outer edges of the locking device would define helices such that disengagement of the coupling could be achieved whichever edge was caused to slide relative to the surface against which it bears.

Figure 19:
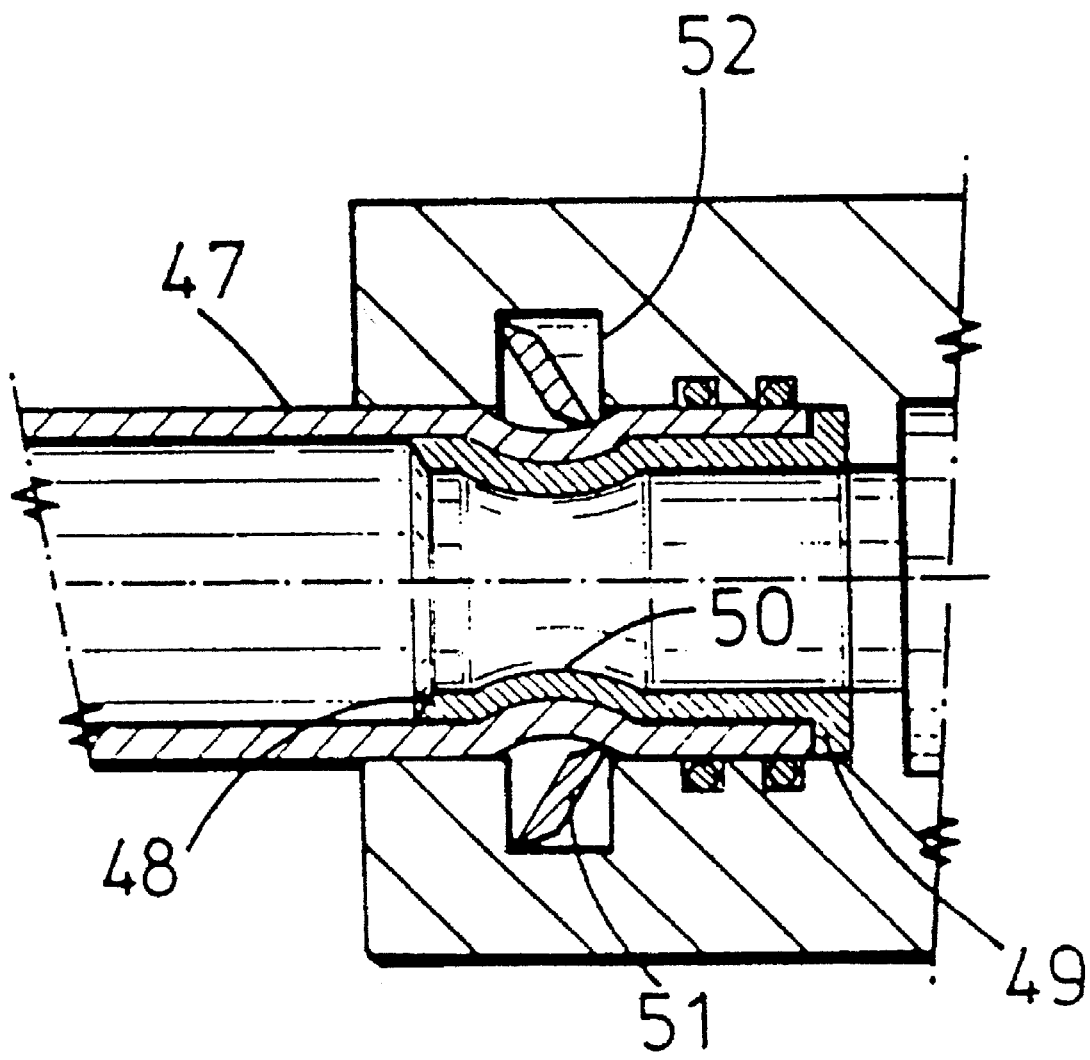
FIG. 19 illustrates a further embodiment of the invention.

The embodiments of the invention described above rely on the stiffness of the tube which is inserted into the coupling to prevent the tube from collapsing radially inwards when an axial load is applied. The invention can be used with tubes that are not stiff provided the tubular insert is pushed into the tube end before the tube end is inserted into the coupling. A simple cylindrical insert may be used, but it is preferred to use an insert that has an annular groove formed in its radially outer surface, the annular groove being axially aligned with the locking device. FIG. 19 illustrates such an arrangement.

Referring to FIG. 19, a low stiffness thermoplastics tube 47 receives within its end a tubular insert 48. The insert supports a flange 49 to limit the depth of insertion of the insert, and a portion 50 of the wall of the insert is deflected radially inwards to define a groove facing radially outwards. The tube 47 and the insert 48 are pushed into the socket of a coupling body substantially identical to that illustrated in FIG. 5, the coupling body receiving a locking ring 51 in an annular groove 52 that is axially aligned with the portion 50 of the insert when the insert flange 49 abuts the inner end of the socket.

The insert 48 may be made from for example a stiff thermoplastics material or metal. If the tube 47 is under pressure, the insert will not need to support much of the radial force applied to the tube. If the tube is subjected to a simple axial load however, the insert 48 must be present to support the loop compressive load.

Given the groove in insert portion 50, the tube 47 is supported at its normal diameter on either side of the point where the locking ring engages the tube. At the point the locking ring engages the tube, as the load is applied the tube is deformed into the groove defined in the insert. This considerably increases the pull-out strength of the coupling.

I claim:

1. A coupling, comprising a first member defining a socket;

a second member defining a spigot inserted into an open end of the socket; and, a locking device received within an annular gap defined between an inner wall of the socket and an outer wall of the spigot, wherein the locking device comprises a plurality of circumferentially spaced relatively stiff load bearing members interconnected by relatively flexible interconnecting means, each load bearing member extending within the annular gap between a first end which is relatively close to the open end of the socket and a second end which is relatively remote from the open end of the socket, the interconnecting means resiliently biasing each load bearing member such that the first end engages the socket and the second end engages the spigot, the interconnecting means enabling each load bearing member to pivot about the first and second ends substantially independently of the other load bearing members, such that each load bearing member acts as a beam in compression to resist withdrawal of the spigot from the socket, the locking device further comprising an annular member of resilient material defining a front face, a back face, a radially inner surface and a radially outer surface, the annual member being provided with a plurality of radial slots grouped in pairs, the annular member being provided with apertures extending radially therethrough at the location of each pair of slots, one slot of each pair extending radially outwards from the radially inner surface of the annual member and the other extending radially inwards from the radially outer surface of the annular member, the arrangement being such that a load bearing member is defined between neighboring pairs of slots and each pair of slots defines said flexible interconnecting means between adjacent load bearing members.

2. A coupling, comprising a first member defining a socket;

a second member defining a spigot inserted into an open end of the socket; and, a locking device received within an annular gap defined between an inner wall of the socket and an outer wall of the spigot, wherein the locking device comprises a plurality of circumferentially spaced relatively stiff load bearing members interconnected by relatively flexible interconnecting means, each load bearing member extending within the annular gap between a first end which is relatively close to the open end of the socket and a second end which is relatively remote from the open end of the socket, the interconnecting means resiliently biasing each load bearing member such that the first end engages the socket and the second end engages the spigot, the interconnecting means enabling each load bearing member to pivot about the first and second ends substantially independently of the other load bearing members, such that each load bearing member acts as a beam in compression to resist withdrawal of the spigot from the socket, the locking device further comprising an annular member of resilient material defining a front face, a back face, a radially inner surface and a radially outer surface, the annual member being provided with a plurality of radial slots grouped in pairs, one slot of each pair extending radially outwards from the radially inner surface of the annual member and the other extending radially inwards from the radially outer surface of the annular member, the arrangement being such that a load bearing member is defined between neighboring pairs of slots and each pair of slots defines said flexible interconnecting means between adjacent load bearing members, the load bearing members bearing against a cylindrical surface and the portions of the load bearing members which bear against the cylindrical surface defining sections of a helix such that the coupling may be disengaged by relative rotation between the spigot and socket.

3. A coupling, comprising a first member defining a socket;

a second member defining a spigot inserted into an open end of the socket; and, a locking device received within an annular gap defined between an inner wall of the socket and an outer wall of the spigot, wherein the locking device comprises a plurality of circumferentially spaced relatively stiff load bearing members interconnected by relatively flexible interconnecting means, each load bearing member extending within the annular gap between a first end which is relatively close to the open end of the socket and a second end which is relatively remote from the open end of the socket, the interconnecting means resiliently biasing each load bearing member such that the first end engages the socket and the second end engages the spigot, the interconnecting means enabling each load bearing member to pivot about the first and second ends substantially independently of the other load bearing members, such that each load bearing member acts as a beam in compression to resist withdrawal of the spigot from the socket, the locking device further comprising an annular member of resilient material defining a front face, a back face, a radially inner surface and a radially outer surface, the annual member being provided with a plurality of radial slots grouped in pairs, one slot of each pair extending radially outwards from the radially inner surface of the annual member and the other extending radially inwards from the radially outer surface of the annular member, the arrangement being such that a load bearing member is defined between neighboring pairs of slots and each pair of slots defines said flexible interconnecting means between adjacent load bearing members, the load bearing members bearing against a cylindrical surface and the portions of the load bearing members which bear against the cylindrical surface defining sections of a helix, wherein both the radially inner and outer ends of the load bearing members define helices, each engaging a respective cylindrical surface in the coupling, such that the coupling may be disengaged by relative rotation between the spigot and socket.

4. A coupling, comprising a first member defining a socket;

a second member defining a spigot inserted into an open end of the socket; and, a locking device received within an annular gap defined between an inner wall of the socket and an outer wall of the spigot, wherein the locking device comprises a plurality of circumferentially spaced relatively stiff load bearing members interconnected by relatively flexible interconnecting means, each load bearing member extending within the annular gap between a first end which is relatively close to the open end of the socket and a second end which is relatively remote from the open end of the socket, the interconnecting means resiliently biasing each load bearing member such that the first end engages the socket and the second end engages the spigot, the interconnecting means enabling each load bearing member to pivot about the first and second ends substantially independently of the other load bearing members, such that each load bearing member acts as a beam in compression to resist withdrawal of the spigot from the socket, the locking device further comprising an annular member of resilient material defining a front face, a back face, a radially inner surface and a radially outer surface, the annual member being provided with a plurality of radial slots grouped in pairs, one slot of each pair extending radially outwards from the radially inner surface of the annual member and the other extending radially inwards from the radially outer surface of the annular member, the arrangement being such that a load bearing member is defined between neighboring pairs of slots and each pair of slots defines said flexible interconnecting means between adjacent load bearing members, the load bearing members bearing against a cylindrical surface and the portions of the load bearing members which bear against the cylindrical surface defining sections of a helix, the radially inner edges of the load bearing members defining a helix free to slide relative to the cylindrical surface against which they bear, the radially outer edges of the load bearing members being prevented from sliding relative to the surface against which they bear, such that the coupling may be disengaged by relative rotation between the spigot and socket.

* * * * *